United States Patent
Petrov

(10) Patent No.: US 10,275,380 B2
(45) Date of Patent: Apr. 30, 2019

(54) BONDING, COMMUNICATION AND CONTROL SYSTEM FOR A SHIPPING AND/OR STORAGE UNIT

(71) Applicant: Inventure Labs LLC, Jersey City, NJ (US)

(72) Inventor: Stan C. Petrov, Costa Mesa, CA (US)

(73) Assignee: INVENTURE LABS LLC, Jersey City, NJ (US)

( * ) Notice: Subject to any disclaimer, the term of this patent is extended or adjusted under 35 U.S.C. 154(b) by 0 days.

(21) Appl. No.: 14/818,721

(22) Filed: Aug. 5, 2015

(65) Prior Publication Data

US 2016/0041934 A1 Feb. 11, 2016

Related U.S. Application Data

(60) Provisional application No. 62/033,472, filed on Aug. 5, 2014.

(51) Int. Cl.
*G06F 13/38* (2006.01)
*G06F 13/42* (2006.01)
(Continued)

(52) U.S. Cl.
CPC .......... *G06F 13/382* (2013.01); *G06F 1/3243* (2013.01); *G06F 13/4282* (2013.01); *G06F 2213/3812* (2013.01); *G06Q 10/0833* (2013.01)

(58) Field of Classification Search
CPC .......... G06F 1/3243; G06F 2213/3812; G06F 3/0635; G06F 3/067; G06F 7/381
(Continued)

(56) References Cited

U.S. PATENT DOCUMENTS

| | | | |
|---|---|---|---|
| 5,561,817 A * | 10/1996 | McCormack | G06F 13/28 710/22 |
| 2005/0062600 A1* | 3/2005 | Olsen | F25D 29/008 340/506 |

(Continued)

FOREIGN PATENT DOCUMENTS

| | | |
|---|---|---|
| CN | 201716586 | 1/2011 |
| CN | 202728908 | 2/2013 |
| JP | 2011-255942 | 12/2011 |

OTHER PUBLICATIONS

European Patent Office, European Search Report, EP Application No. 15829757.2, dated Feb. 16, 2018, 9 pages.
(Continued)

*Primary Examiner* — Benjamin P Geib
*Assistant Examiner* — Getente A Yimer

(57) ABSTRACT

A bonding, communication and control BCC system that, via multiple digital and analog inputs and outputs provided by an on-the-go ready (OTG) microcontroller and a microcontroller combination, is capable of integrating the function of components required for a device to perform its tasks. Each BCC unit has the minimum amount of built in hardware required. First the BCC units bond, using multiple modes of identification and recognition technology. Second, the BCC units interconnect and exchange data via encrypted communication. Third, plug and play hardware can be added to the BCC unit. Each BCC unit can pair with a smart device, making possible full utilization of all of the hardware, software and existing infrastructure of the smart device, including its ability to send data to and from a remote server location.

18 Claims, 11 Drawing Sheets

(51) Int. Cl.
   *G06Q 10/08* (2012.01)
   *G06F 1/32* (2006.01)
   *G06F 1/3234* (2019.01)
(58) Field of Classification Search
   USPC .......................................................... 710/38
   See application file for complete search history.

(56) References Cited

U.S. PATENT DOCUMENTS

| | | | | |
|---|---|---|---|---|
| 2005/0110639 | A1* | 5/2005 | Puzio | G08B 13/14 340/572.1 |
| 2008/0094209 | A1 | 4/2008 | Braun | |
| 2008/0174424 | A1* | 7/2008 | Drake | G01F 15/063 340/539.27 |
| 2010/0125686 | A1* | 5/2010 | Perng | G06F 13/4022 710/38 |
| 2011/0234378 | A1* | 9/2011 | Radley | G01T 7/00 340/10.1 |
| 2011/0307638 | A1* | 12/2011 | Chen | G06F 13/385 710/63 |
| 2012/0112902 | A1* | 5/2012 | Meyers | G08B 13/1436 340/539.1 |
| 2012/0330228 | A1* | 12/2012 | Day | A61M 5/14244 604/82 |
| 2013/0332641 | A1* | 12/2013 | Selkirk | G06F 1/1632 710/304 |

OTHER PUBLICATIONS

J. Ducoloux et al., "An Embedded USB Dual-Role System Integrated for Mobile Devices", 2012 Argentine School of Micro-Nanoelectronics, Technology and Applications, Aug. 9, 2012, 7 pages.

* cited by examiner

BONDING, COMMUNICATION AND CONTROL SYSTEM FOR A SHIPPING AND/OR STORAGE UNIT

CROSS REFERENCE TO RELATED APPLICATIONS

This application claims the benefit of provisional application No. 62/033,472 filed Aug. 5, 2014 for Cryogenic Carrying Case Communication System. The entire application is incorporated herein by reference.

BACKGROUND OF THE INVENTION

1. Field of the Invention

The present invention relates to communication and control systems that include a reusable communicating container and a user interface.

2. Description of Related Art

The FDA recently approved the use of bone grafts, mesenchymal cells, umbilical stem cells, skin grafts, for clinical trials or use in treatment of many conditions. In addition, the use of bioengineered skin substitutes (BSS) is well established and growing. Indeed, transplantation medicine is gaining in popularity as research snowballs and brings the potential advantages of this innovative approach to the fore.

Unfortunately, the technology involved in the less exciting of production—transport and storage of the biomaterial—has not kept pace with the biotechnical advances. In addition, tracking of the shipments and communication of the resultant information is unwieldy and generates little useful information. In fact, full knowledge of what is happening to the biomaterial is woefully deficient.

FDA compliance requires that records are kept of biomaterial transport from the manufacturer to the medical facility and that, if for example, the substance must be stored at $-80°$ C., the medical facility monitors the temperature of the freezer daily. Records are then kept in binders on the premises. Naturally, the cumbersome nature of the records themselves ensures that this record-keeping is a formality at best.

The shipping records that are kept are inadequate. Although there is a record of where the biomaterials were and for how long, there is no record of their transport from the donor or cell production facility to the manufacturer. Only limited data about whether they were kept at the requisite temperature during transport is available. In addition, at no time is data sent from the medical facility to the manufacturer. This is not required. But there is little doubt that it would be useful. Many manufacturers would value being able to see which medical facility had the highest success rate with which products, which products work best in which patients, and more, enabling them to refine their product based on real time feedback. Current systems do not allow the sharing of this type of data. Neither do they provide the high levels of security needed for such data sharing to be viable.

Although shipment via various couriers can be tracked by periodic login, information about the actual state of the cargo, the identity of the individual courier or the real time location is limited and only accessible via cumbersome and proprietary systems. There is even less ability to intervene if something is going wrong, or the cargo is inadvertently delivered to the wrong address.

SUMMARY OF THE INVENTION

The Bonding, Communication and Control System (BCC system) of the present invention makes possible both real time tracking and control of container shipments. The present invention provides a simple, cost-effective and powerful system that addresses all the above problems.

The present invention allows the cryogenic container described in co-pending application U.S. Ser. No. 14/021,142, U.S. Pat. No. 10,001,313, granted Jun. 19, 2018, or any other shipping or storage container, to interact with its environment and users of the container by means of a microcontroller with multiple digital and analog inputs and outputs that can be combined with sensors, communication hardware, identification hardware, a display, and other peripherals. The invention, whether integrated into the traveling container or contained within a pluggable module, can collect real time data such as the temperature of the cargo, the contents of the container, its location, a log of how long the enclosed material has been in transit and where it has been. The data can then be communicated between BCC system-associated containers, stored and processed on a smart device, and at a remote location, retrieved to be available to a user, the transport company, the biomaterial manufacturer, or other interested party, and put to use, for example by remotely controlling the functionality of the BCC system-associated containers.

The keys to the power, functionality and versatility of the present invention are that it: 1. Has a minimal amount of hardware that allows it to operate autonomically, 2. Forms a mesh network with other similar units, 3. Accepts conventional standard plug and play universal connector hardware, 4. Pairs with smart devices, and 5. Implements a unique ID and bonding system.

The dynamic bonding system of the present invention encompasses every aspect of the BCC system (cargo, ID, hardware and software of the smart device and the unit, for example) and allows the BCC system to recognize and pair with, for example, the cargo, the courier, the facility, the patient, and the end user. Because the associated container is always bonded with one or more components of the BCC system, this provides a secure, accountable, and novel way to track and control, with no information ever lost. With the BCC system, a user can not only monitor, but also remotely alter the function of, the microcontroller and attached peripherals, for example, securely changing the temperature of the container, whether via solenoid, compressor or other hardware.

The hardware of the BCC system provides support for, and allows the user to add, nonproprietary hardware via its standard plug and play universal connectors. The user can thereby customize the container to fit specific functions and seamlessly integrate with current infrastructures with their built in hardware and software. This makes the BCC system extremely versatile and cost efficient. The BCC system can be utilized in many capacities including shipping of cold cargo and non-cooled cargo, storage and inventory, real time remote environmental control, and customized data handling.

Compared with current devices used for tracking, temperature control, and user interaction with shipping and storage, the BCC system of the present invention offers an entirely new approach. The BCC system platform is designed to allow full functionality and maximized plasticity in terms of software and hardware, yet offer functions not currently available. With a minimum amount of hardware the BCC system will perform basic functions, such as addition of peripherals, data gathering, monitoring and control of the container internal environment, the ability to identify cargo, users, and report its location. The versatility of the BCC system is enhanced by not using permanently combined predetermined peripherals such as sensors and other accessories. The system controller by way of standardized connectors, provides full functionality to nonproprietary universally accepted peripherals. The BCC system can integrate with, and fully utilize existing infrastructure, such as a smart device, for example.

The use of a smart device with the BCC system provides many benefits. It allows data from the BCC system to be processed and remotely stored and retrieved. It also provides for a high level of security and a superb user interface. The multiple built in security features and sensors of the smart device can be utilized to enhance the security and usability of the data.

Unlike shipping systems on the market, the BCC system of the present invention is capable of recognizing IDs, whether of people, cargo or locations, with a minimal amount of hardware. Besides being able to monitor temperature and other environmental factors, the BCC system automatically recognizes what is placed inside the container, who is using it, where it is, and when objects are placed in, or a person approaches the BCC system enabled container. The BCC system can use various modalities of communication, such as infrared, for example to allow communication between individual BCC system units, creating a network of such units. Further expansion of communication capabilities is provided by the ability of having one smart device bonded to multiple BCC system units, or multiple smart devices bonded to one BCC system unit, or any combination of these.

Because the BCC system of the present invention can use existing smart device infrastructure, it is capable of storing and processing data remotely and allowing remote access and real time control of the BCC system and its peripherals. For example, the BCC system with a Cryo container allows a user to alter the temperature of the container by control of a solenoid. However, because the BCC system digital and analog inputs and outputs have standardized connectors, a user can choose a unique combination of features such as remotely controlling the container environment, keeping the cargo cold, keeping data secure or keeping inventory of cargo, couriers, and vendors.

The BCC system can make any container useful for storage, transportation, tracking and control on a global scale. The BCC system can be made compliant and used in any part of the world through use of third party hardware. The many potential layers of security and accountability provided by bonding the BCC system to users, cargo, location and third party devices, and the ability to integrate into existing infrastructures and systems, makes the present BCC system invention an attractive option for government agencies and Customs. Because the BCC system neither requires labels nor any identifiable visual information for shipment, unauthorized personnel are totally blocked from its data, whereas authorized personnel can be provided with a complete record of what is in the container, who had access to it, and where it has been. Indeed, if needed, additional hardware can be directly added by the universal connectors in order to allow the data regarding the cargo, people, and events to be made available to various authorized agencies through their infrastructure, which might include smart devices, computers, and other modalities, adding to overall security and expediting the process.

The BCC system provides the ultimate cross border solution. As a shipping or storage container is pressed into service in various countries, any concomitant communication system must be compliant not only with the regulations of the relevant airlines, but also with the laws and regulations of each country through which the airline passes. The BCC system makes this possible in a cost-efficient and convenient manner. In a preferred embodiment, when the peripherals detect a container on an aircraft, it switches the modality of communication to one that is approved and does not interfere with the electronics of the craft. Thus the BCC system can create an infrared mesh network that has an approved bonding device capable of transmitting data continuously during flight. The user can monitor and control the environment of the cargo during flight. Once in the destination country, the user can add various types of communication hardware that is compliant with the various regulatory agencies enabled by plugging in a commercially available USB dongle into the Cryo container or other shipping container, with the BCC system, taking advantage of the USB-ready controller and the system standard connectors.

There is currently no device or system available that can provide the versatility of the BCC system of the present invention. When paired with a Cryo unit, the BCC system can monitor the environment and deliver data regarding the cargo and location and allow the user to real time control the temperature from anywhere in the world. However, because of the ability to connect with (bond) other devices, creation of a mesh network, use of standard connectors, pairing with a smart device, software and hardware, the applicability of the BCC system according to the invention goes well beyond its potential for shipping biologic material.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENT

A communicating multi-core cooling container that can operate with the BCC system of the present invention is described in detail in co-pending patent application U.S. Ser. No. 14/021,142, filed on Sep. 9, 2013 for Communication Case For Biological Material U.S. Pat. No. 10,001,313, granted Jun. 19, 2018. The entire disclosure thereof is incorporated herein by reference.

Figure 1:
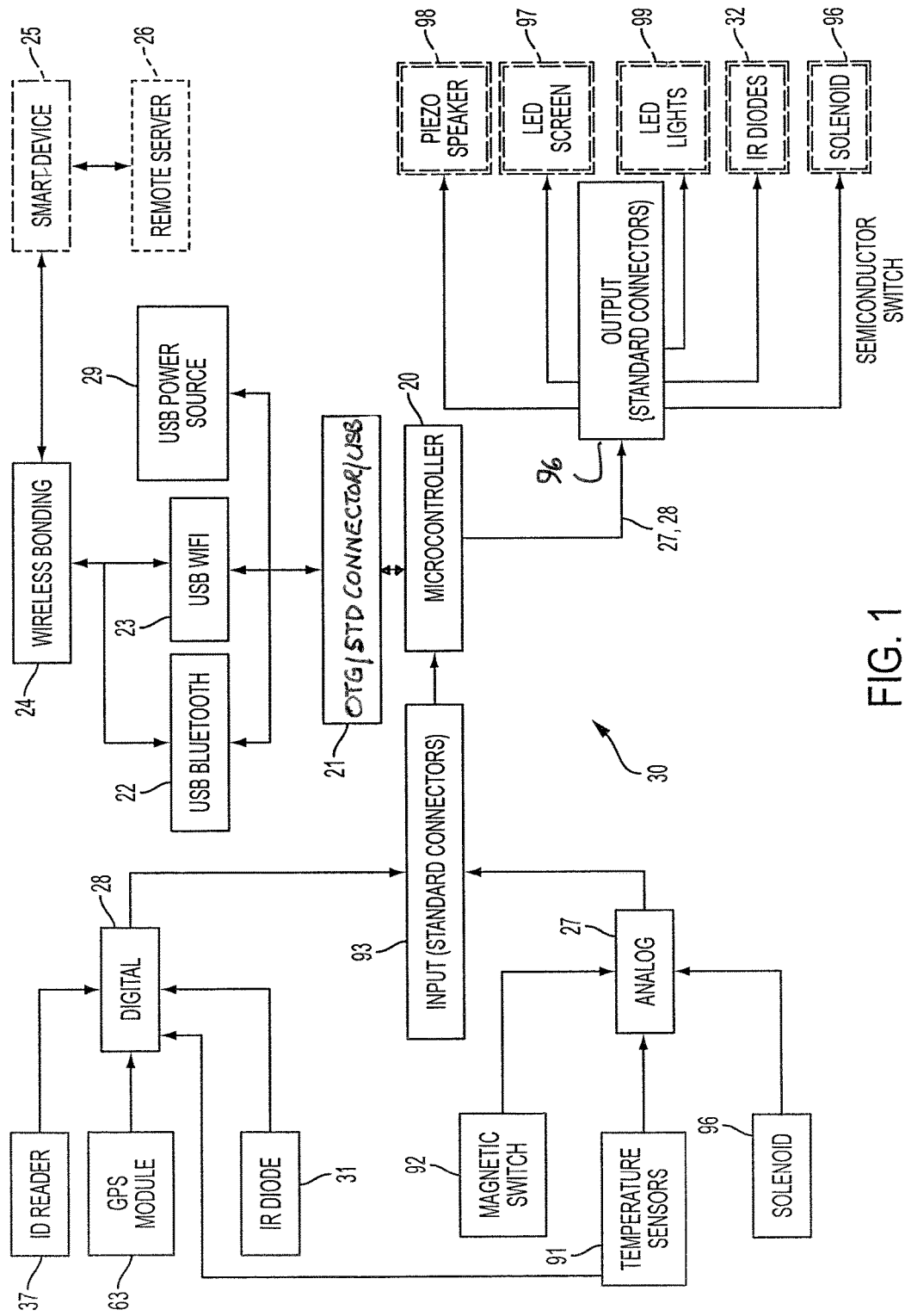
FIG. 1 is a block diagram of the BCC system hardware configured for use with Cryo containers.

FIG. 1 details the electronic hardware, outputs, and inputs that provide the functionality of the BCC system. The present invention is equally applicable to both cold cargo shipping and storage and to shipping and storage of non-cooled cargo.

The hardware needed for full functionality of the BCC system will now be disclosed. An on the go (OTG) microcontroller 21 contains the firmware and software needed to act as a host or a slave to a Universal Serial Bus (USB) in order to support and communicate with various peripheral devices, which are connected to the OTG microcontroller 21 via the USB. The USB may be any type of communication channel that allows communication with peripheral devices, wirelessly. The USB peripherals, Blue Tooth 22 and WiFi 23, allow the OTG microcontroller 21 attached/in the container unit to be synchronized (paired and bonded 24) to a smart device 25, thus allowing data to go back and forth from the smart device 25 to a microcontroller 20. The smart device's hardware and communication capabilities further enable the data to be stored remotely on, and retrieved from, a remote server 26. The microcontroller 20 has multiple inputs 93 and outputs 96 with standard plug and play connectors to connect to various analog 27 and digital 28 peripheral components.

The BCC system hardware can either be part of each container unit or be enclosed in a separate BCC system module that provides power to, and communicates with, various analog and digital devices such as piezo speaker 98, LED screen 97, LED lights 99, IR diodes 32, solenoid 96, magnetic switch 92, temperature sensors 91, for example.

In a preferred embodiment, the BCC system is combined with a reusable multicore cooling container (Cryo) and is paired with a smart device 25 that provides a user interface and additional hardware. The smart device 25 could be smart phone, tablet or computer, for example, or any device that has similar functions. In order to increase the functionality of the BCC system, the smart device uses data received from both the BCC system and the remote server 26. This data is processed by the smart device's software and hardware. By using the interface and controls of the smart device, data is sent to the BCC system and the remote server 26. Data from both the remote server 26 and the smart device 25 can be stored on the microcontroller 20.

An important feature of this invention is that BCC system unit 30 can establish communication with other BCC system units by different modalities, based on the built in basic hardware 22, 23, 31 and 32, thus allowing the unit to exchange data with other units. Furthermore, if any of the BCC system units have been paired and bonded with the smart device 25 then, via the hardware, software, and infrastructure of the smart device 25, data can be used and remotely stored and retrieved. This data can be utilized via a mesh network, described hereinafter, that is created between multiple BCC system units. If any of the BCC system units in the network are bonded with a smart device, a unit that is not in direct communication with the smart device 25 can utilize the capabilities of the bonded BCC system unit to establish data flow with a remote server 26.

Another central feature of the BCC system according to the present invention, is bonding. The bonding system encompasses all the BCC system 30 hardware and its related infrastructures, hardware and software, providing unsurpassed security and accountability. For example, in the case of using Blue Tooth 22 to pair a system unit with another device, close proximity between the BCC system and the bonding partner is required, adding a physical layer of security. For the Cryo container, a user with ID must be within a specific distance of the BCC system unit associated with the Cryo container to establish bonding.

The unique design approach of the invention, where it integrates into existing infrastructures and uses their hardware and software, and communication abilities enables the user to both cost and time efficiently choose, or add, various levels of security, modify the user interface, and alter data processing and storage. For example, using the smart device's developer software, custom applications could be created and either distributed directly or made available via the Google Play Store or Apple Store, for example. Currently the Cryo container with BCC system prototypes are optimized to work and integrate with an Android based system, but an IOS version has also been developed.

An embodiment of the invention utilizing an Android based operating system with a smart device and a Cryo container will now be described. A detailed description of bonding and the formation of a network will follow hereinafter.

Figure 2:
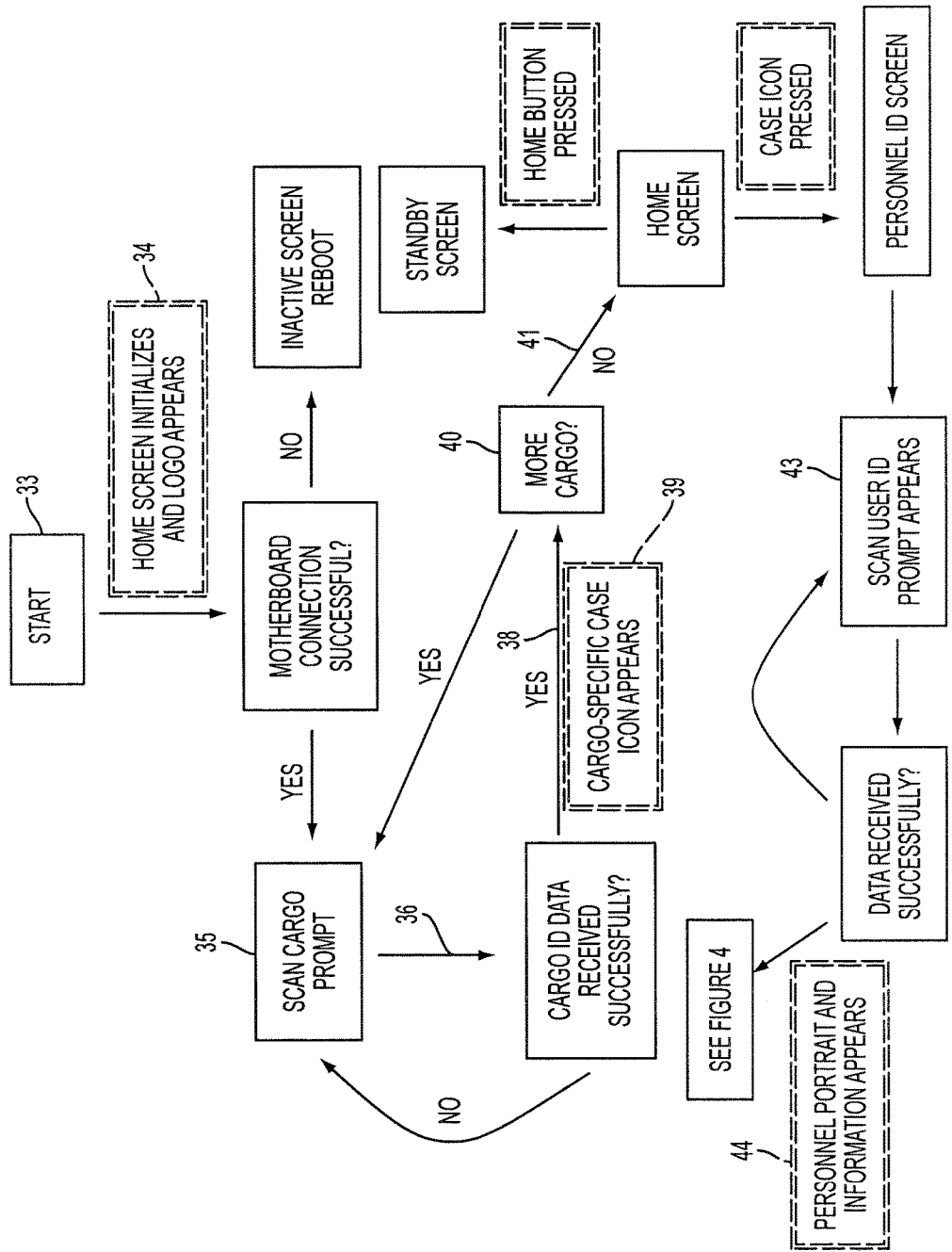
FIG. 2 is a software logic flow chart showing initialization of the BCC system container, recognition of the cargo being loaded into the container and recognition of personnel using the container.
Figure 3:
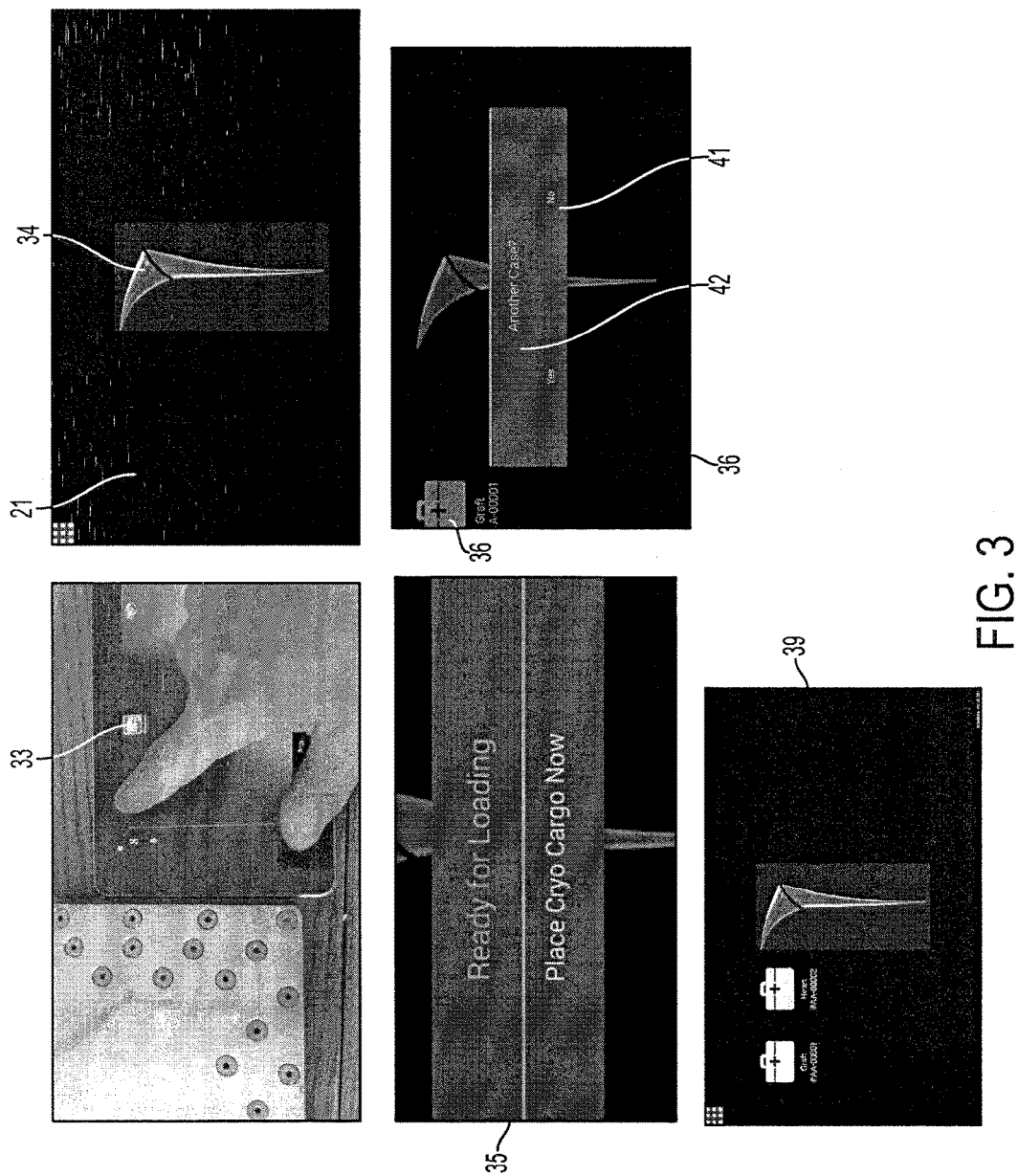
FIG. 3 is a series of pictures showing the screen of a system unit.

The first step is to initiate a pairing and bonding between the smart device 25 and the BCC system 30. This requires a user to pair the smart device 25 via password-protected Bluetooth hardware 22. As shown in FIGS. 2 and 3, once pairing has been established, the user chooses the invention application using the smart device by clicking on the icon 33. While the application is loading and secure connection is verified, a logo 34 appears. Upon establishment of successful pairing and identification, as well as a self test of various hardware, some of which is shown in FIG. 1, the smart device 25 will alert the user that the BCC system 30 is ready to pair and bond to the cargo 35 to be placed in the container. The bonding process is described hereinafter, but in this specific example, the cargo ID 36 is read by the built in hardware ID reader 37 (FIG. 1). However, the cargo ID can also be read by other components, including the smart device 25 or another peripheral. Basic physical bonding is then complete.

FIG. 2 shows a next step, where the data read from the cargo ID is obtained 38 and, utilizing the paired smart device's hardware, software and its support infrastructure, the data is processed and securely sent to be stored at a remote location server 26. This data can be further processed on the server and selected relevant data from the infrastructures and the remote sites can be pushed back to the smart device 25 and to the BCC system 30. For example, in the case of the BCC system associated with a Cryo unit, this allows the user to see a container on the screen 29 of the smart device 25, as shown in FIG. 3. The user is then allowed to pair another container with cargo 40, 42 to the smart device 25, and so on, until the user determines that there are no more containers with cargo to be added to this particular smart device and presses "done" 41.

In a preferred embodiment, data constantly flows in packets. Specific instructions regarding, for example, control of the cargo's environment within its specifications are sent to the microcontroller 20 (FIG. 1). This data allows a bonded user to view the nature of the cargo 38 (FIG. 2), what its ideal temperature is, other necessary environmental controls, the shipping details, and more, as detailed hereinafter. The scope of the data accessed from the packet is determined by the user privileges. This data could include libraries of instructions or commands on how the microcontroller 20 should function based on the nature of the cargo, the data from its environment, and the user input, for example. In the case of a person who has been determined to be allowed total access, a super-user, the smart device 25, shown in FIG. 1, may also store all the data needed to perform all of the functions, including direct control of the microcontroller 20. This will allow the super-user to change or alter the functions of the system and its peripherals directly, even without requiring the use of the remote location. For example, if the invention is associated with a Cryo unit, it can change the function of the solenoid 96, thus presetting the temperatures of the cargo. Since one potential function of the Cryo is to ship healthcare products, automatic recognition, tracking, custody and environmental control, as well as the added layers of security and flexibility, makes the current invention capable of assisting with compliance with FDA reporting requirements and keeping inventory, and also helpful in minimizing human error.

Figure 4:
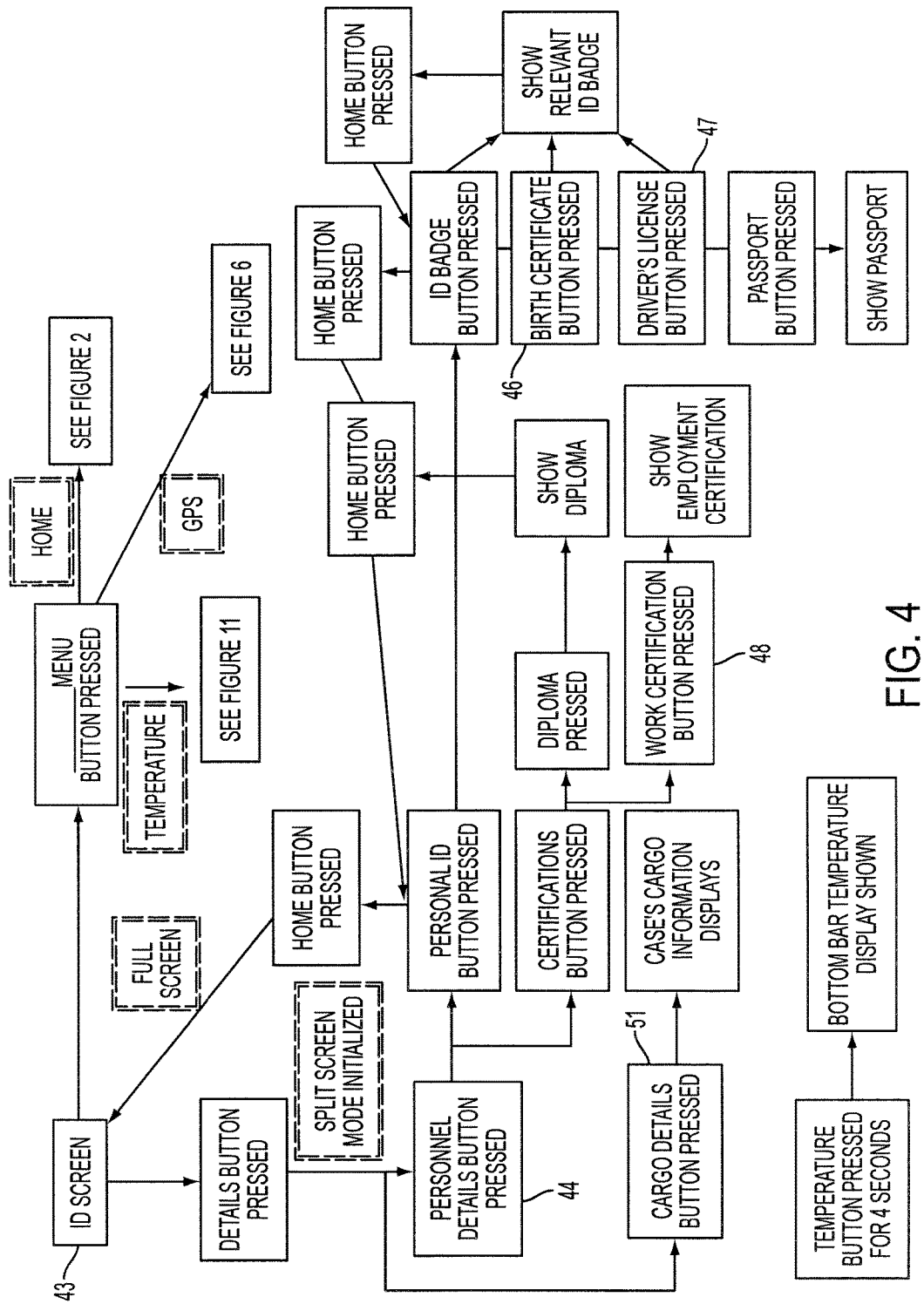
FIG. 4 is a software logic flow chart for the BCC system showing recognition of personnel to be bonded with the BCC system and display of their various credentials.
Figure 5:
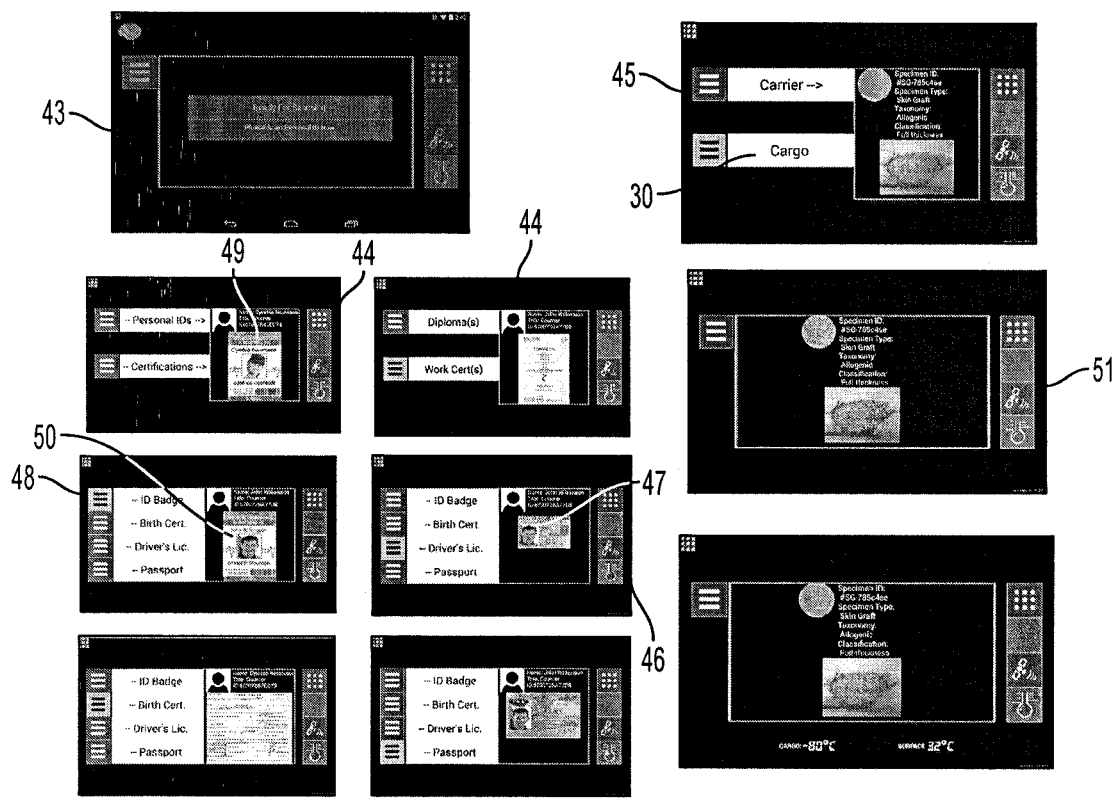
FIG. 5 is a series of pictures of the screen of a BCC system during user and cargo recognition.

The present invention, the smart device and existing infrastructure can be used interchangeably to perform various functions. In FIGS. 1, 4 and 5 it is seen that the RFID reader 37 that was used to read the cargo ID 36 can also read the ID of a person 43. However, because the BCC system 30 pairs with smart devices, this ID 43 can also be obtained by the smart device software and hardware, and their built in security features, such as fingerprints, camera, bar code reader, voice recognition, for example, or any other BCC system with which the smart device can interconnect.

This multipronged approach to personnel bonding verifies authorized users by recognition of their credentials 44, determines their level of access and adds several layers of security to the system. After successful ID recognition has been accomplished, a person is allowed to bond to the BCC system 45 and a predetermined level of information about them 44 is displayed on the smart device 25 (FIGS. 2, 4, and 5). Using the smart device software and hardware, a user with a high level of access can then interface with the BCC system and access personnel data, and display various types of information about the bonded personnel 46. In this embodiment, the logic flow in FIG. 4 and the screen shots in FIG. 5 show examples of the types of data that can be displayed, such as the driver's license 47, employment certification 48 of the courier 49, physician 50, patient (not shown), or other bonded personnel, for example.

The smart device's user interface can also be displayed on a web browser simply by utilizing the smart device's built in communication infrastructure, thus allowing super users to gain complete real time and remote access to the functionality and control of the BCC system. As shown in FIGS. 4 and 5, bonded authorized users may gain access to further details about the cargo 51, initializing this by clicking on the icon for the container of interest. Any number of Cryos or containers with the invention can be paired to the same smart device at any time (FIG. 3, 39), and any number of smart devices can be simultaneously paired to one container, or any combination of the above.

Figure 6:
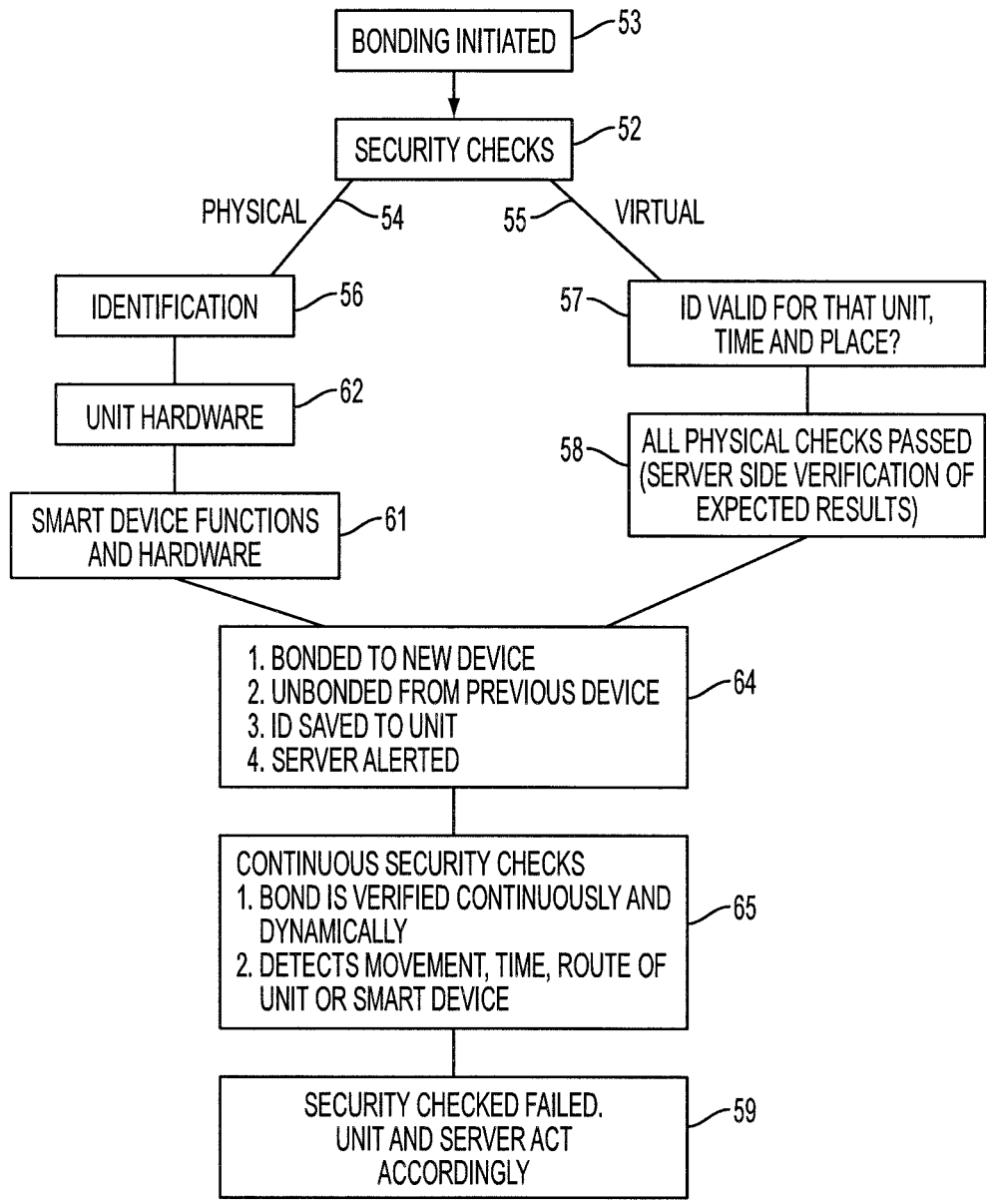
FIG. 6 is a flow chart illustrating the user and cargo recognition bonding process, showing the security checks that must be passed for bonding between the BCC system units and a smart device, cargo, a user, or a location.

The process whereby an invention-associated container pairs to another object, be it cargo, a person or a place, is called bonding in this application. The bonding process is illustrated in FIG. 6 and is, in part, the reason for the accountability and security that use of the invention brings. In order for successful bonding to occur, many prerequisite steps must take place and several conditions must be met 52. These checks can occur in any order and may be combined with other steps. If any step or condition fails, the container will not bond. These measures are essential, because when a container pairs to a smart device, it enables viewing of status information about, and control of, that container. That is, bonded users are able to view real time information about containers to which they are bonded and, as mentioned above, depending on their clearance level, may even be able to send commands to, and control, the system and its paired hardware. Obviously, this also increases BCC system accountability, since it is always possible to trace back to previously bonded objects and one can real time keep track of what is in, and who opened, each container, a real cross border enablement benefit when, for example, a container is negotiating Customs.

FIG. 6 outlines the security measures, criteria and process involved in determination of eligibility for bonding. After a bonding request has been received 53, the BCC system runs both physical 54 and virtual 55 security checks. Because these checks run in the background, all the user needs to do is verify the identity of to what they are bonding the Cryo or container 56.

The invention uses the smart device connection to check the server for whether it should bond to an object, that is, whether the ID is valid for that particular container or Cryo, that time, and that place 57. For example, if one were attempting to bond a human heart to a Cryo container that was built to carry skin grafts, the BCC system would refuse bonding. Likewise, if a user were attempting to bond healthcare items that must be shipped at −80° C. to a container that is not equipped to cool, bonding would not occur. The server verifies all of the physical security steps, because it knows what the expected results are and can take appropriate action on any untoward results, either by refusing bonding or by allowing progress to the next step 58. The server will also deny bonding if the physical checks of the smart device and container do not match up with the expected results 59. This can include the expected route, where the unit currently is on that route, the elevation, for example.

At the same time, physical security checks are launched, in any order and in any combination 54. First, bonding requires physical ID verification 56, such as RFID tags, barcodes, and fingerprint recognition. As mentioned above, the ID of the cargo, user, courier, is checked through the capabilities of the smart device, both server side 55 and physical side 54, to determine validity.

Concomitantly with this, bonding is verified using combinations of the smart device functions/hardware 61 and the hardware peripherals 62. This functionality requires connection between the cargo container and the smart device by way of any of the communication functions shown in FIG. 1. For example, concurrent use of the container's GPS system 63 and the smart device's GPS coordinates 25 would determine whether they are in close proximity. Referring again to FIG. 6, if these security measures are not fulfilled, then the container will not bond 59. Of note is the fact that a check can occur in the absence of Internet connection. The smart device can access the necessary details, store them, and then use them when bonding occurs, even without server access. In effect, this doubles the security since, in the presence of Internet, each unit can be matched against the server side expectations.

Once the invention has verified that the security checks have been passed and bonding is allowed, it will un-bond the Cryo container or other container from the previous cargo, user, courier, location, for example, 64 and the new ID will be saved. Un-bonding can only occur during the bonding process, so that the container with system, be it cryogenic or otherwise, is always bonded to something. Un-bonding alerts the smart device and the server to the fact that the Cryo or shipping container has switched one of the devices to which it is bonded. The BCC system saves the last bonded ID so that, if it is ever disconnected from the network, it can provide that information when it reconnects.

As an added measure of security, the container, smart device and server continuously verify a bond once a container has been bonded 65. This allows the container, smart device, and server to be alerted and take action if there is a problem, such as an attempt to access a container associated with the invention from an unpaired smart device 59. In the preferred embodiment, the Cryo container will send an alarm to the paired smart device, alerting bonded users to the problem (not shown).

Figure 7:
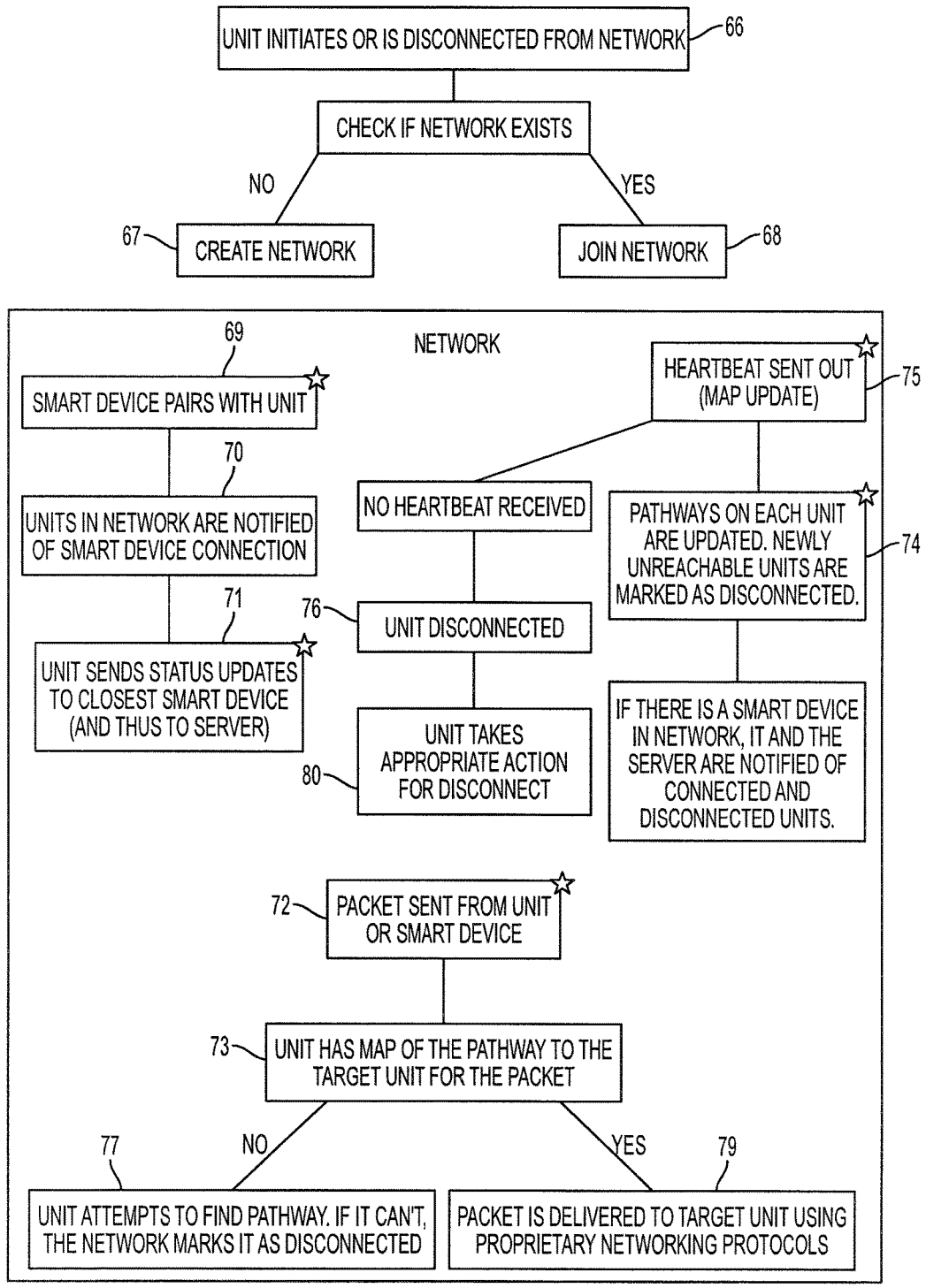
FIG. 7 is a flow chart illustrating the formation of a mesh network by individual system units with or without a smart device, the update of the network by sending and detection of heartbeats, and the transmission and reception of packets to and by networked BCC system units.

Because neither shipping and storage containers nor smart devices have continuous access to Internet, the invention uses a proprietary network and packaging protocol. This novel method of communication, illustrated in FIG. 7, dynamically generates and maintains a mesh network via wireless infrared 31, 32 (FIG. 1) in the preferred embodiment, but can operate via other modalities. This network is the means whereby the invention maintains a map of pathways between containers or BCC system units. The network is initiated 66 when two or more invention-associated containers are in close proximity 67. If no smart device is paired with any of the BCC system units within that specific mesh network, they will simply maintain the network 68, awaiting one of the BCC system units to connect to a smart device for further instruction.

Once a container with the BCC system has been paired with a smart device 69, the mesh network is opened to the smart device 70, and by way of the smart device, to the server 71. This allows the server full access to any of the units within that network, regardless of physical distance, even though only one of them is paired to the smart device. The network can encompass an indefinite number of containers associated with the BCC system. Communication occurs by sending a packet 72 to any of the units in the network so long as there is a pathway 73. The network is self contained and it can dynamically change as required to add, remove and remap the pathways to the BCC system units 74.

In order to create a network, when a container with the invention is first started, or when it is temporarily disconnected from a network 66, it will wait and check for any existing networks via detection of a periodic pulse of information or "heartbeat" 75. If, after a period of time, it has not been able to find a network, it will then start to create its own network 67 so that other BCC system units may join 68. This network is set up so that, even if the unit that first created the network disconnects, the network continues to function as it did when the initiating unit was connected. That unit is simply noted as being unreachable or disconnected 74.

After a network has been established, the BCC system units will maintain a map of optimal pathways to each container with the system within the network 74. This map can change and update as needed as the BCC system units are physically relocated and positions or pathways change. Each BCC system unit in the network manages a map of pathways to other units with which it can communicate. Thereby, when a smart device pairs to any of the BCC system units in the network 69, it can access all of the data that BCC system unit maintains of the pathways within the network. This is used to create packets 72 to send out to the rest of the mesh network using the shortest pathway, or the least number of hops, to each of the other BCC system units 73. It is important to note that another smart device may pair to a different BCC system unit in a different area of the network, and that other smart device would then use a different map of pathways 73.

Each unit keeps track of which BCC system units it can communicate with, and because of the nature of the physical communication of the BCC system units, when a BCC system unit sends out a packet 72, utilization of the shortest route is dynamic. If a response from a unit is shorter than the previous pathway, the pathway is updated 74. The containers with BCC system can also mark pathways and other BCC system units as unreachable and no longer connected automatically 76, 77.

The constant transmission of a heartbeat 75 by BCC system units to the network from one to the other provides several functional advantages. First, removals of units from the network are detected because they will no longer receive the encrypted data packets that keep the idle network updated 77. This means that individual units are alerted when they have been disconnected so that they can take appropriate action 77. Second, additions to the network are noted. Third, the heartbeat ensures that the network map is constantly updated and that information is sent via the shortest route possible 74. The encryption on the packets and verification of the bond is dynamic, so the units and smart device/server can verify the integrity and origin of the packet, giving the system additional security.

The mesh network created by the BCC system units can also encompass smart devices 69. For example, when a smart device pairs with a container, both the smart device and the server can then connect into and utilize the mesh network of which that unit is a part 71. The smart device can then send out packets to the individual units 72. When a container with invention unit has been marked as unreachable from the network, the smart device and server will also react accordingly 77, 79. The benefit of this arrangement is that, even though a unit may not be directly paired to a smart device, a qualified user can still receive status and information updates from, as well as send commands to, the BCC system unit 79.

When a BCC system unit is disconnected from a network, it is still able to maintain its own basic functions and will keep track of essential information until it re-establishes connection to a network. The unit will attempt to join in to any network it can find 68. Alternatively, as mentioned above, after a period of time and if nothing has changed, such as, for example, data from the GPS and any of the analog/digital inputs/outputs, it may create its own network 67.

The BCC system units in the network created by the BCC system communicate via encrypted packets, which can even be directed towards a specific unit 72. Each packet contains varying amounts of information and differing content. The action performed on the receiving units depends on the contents of the packet received. For example, the packet may contain instructions to change the temperature or send an alarm to the user. In addition, although the program for the invention/system is on the microcontroller 20, whether it is part of the container or a separate module, the firmware/software can also be rewritten for this system.

The present invention provides many layers of security. First, the BCC system units are always in communication with the network, so that unauthorized removal of a BCC system unit can instantly be detected and reported 80. Next, each BCC system unit can load a firmware based on its cargo, if needed, whether via a smart device or from the server. Bonding is, therefore, also beneficial in terms of adding security to the network through which the units communicate. Once a device with server access has been bonded, other BCC system units can use any of the security checks present in the stages of the encryption of packets within the network for verification of a packet's requests. For example, in the preferred embodiment, a Cryo container is always bonded to a smart device, in communication with a server, and sending heartbeats to, or pinging, the other BCC system units in its network. Because of this connectedness, it can verify location, user, temperature and cargo by a number of methods, including use of the smart device's inbuilt capabilities, such as the ability to read fingerprints, bar codes, and facial recognition, for example. That is, it is possible to use any sensor on, or feature of, the smart device, or any combination of them, to add security to the BCC system. Because the BCC system units continue to send out updates and alerts in real time, location of missing BCC system units will be enabled.

Figure 8:
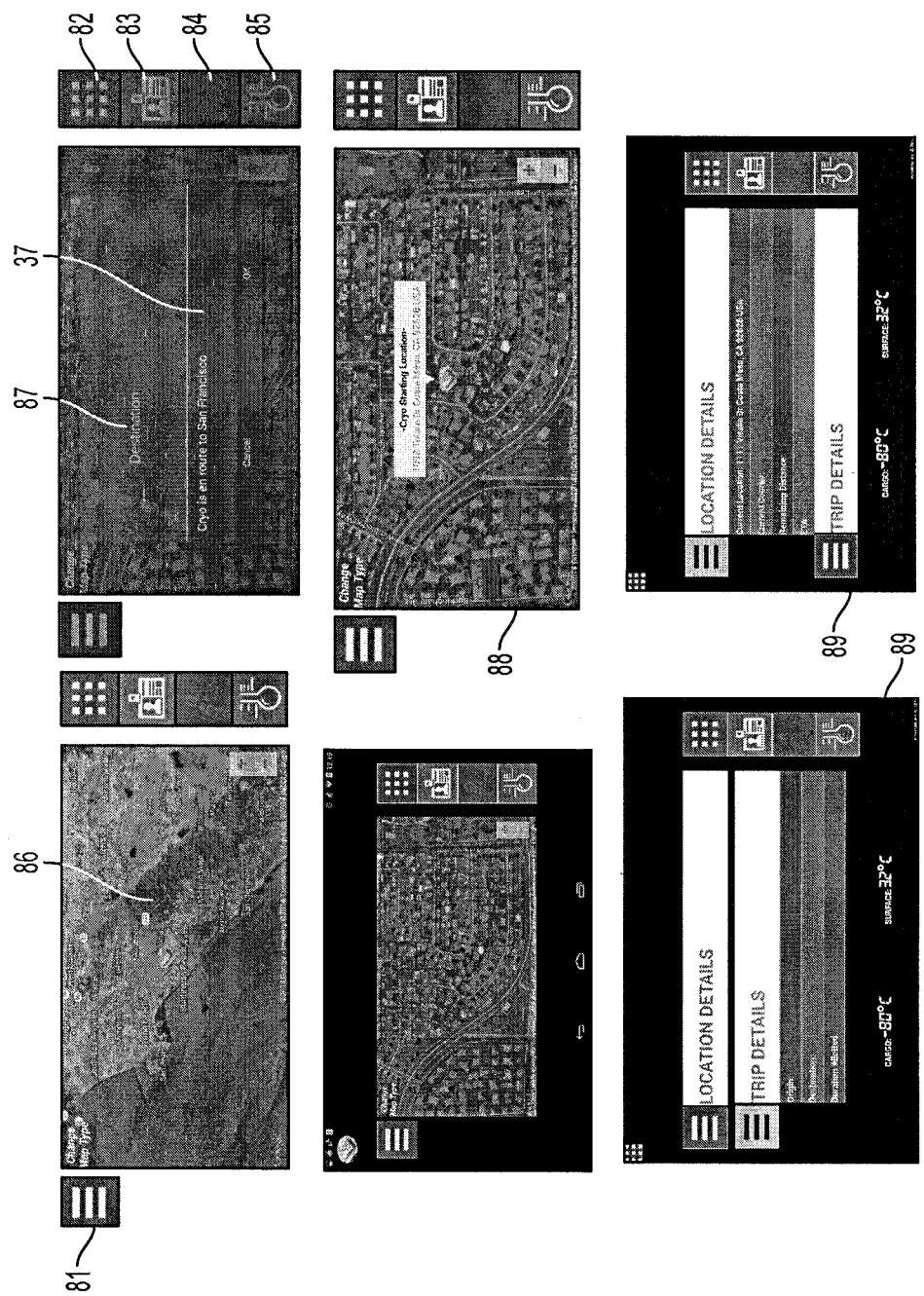
FIG. 8 is a series of pictures of the screens of possible user interfaces with regard to tracking of the cargo in a BCC system unit.

The operation of a preferred embodiment of the invention, which is paired to a Cryo container with a smart device and an Android system, emphasizing user interface aspects, will now be described. As shown in FIG. 8, the screen on the container or on the smart device displays five basic buttons: the first gives further details about the screen that is being displayed 81, the second 82 is a back button and will return the user to the previous screen, the third 83 gives information about the registered users, the fourth 84 allows real time tracking of the location of the container, and the fifth 85 allows viewing and remote adjustment of the core temperature of container. It is to be understood that updates to the software may result in a different arrangement and content on the interactive interface. In the preferred embodiment, depression or selection of tracking button 84 initiates the logic flow displayed in FIG. 9.

Figure 9:
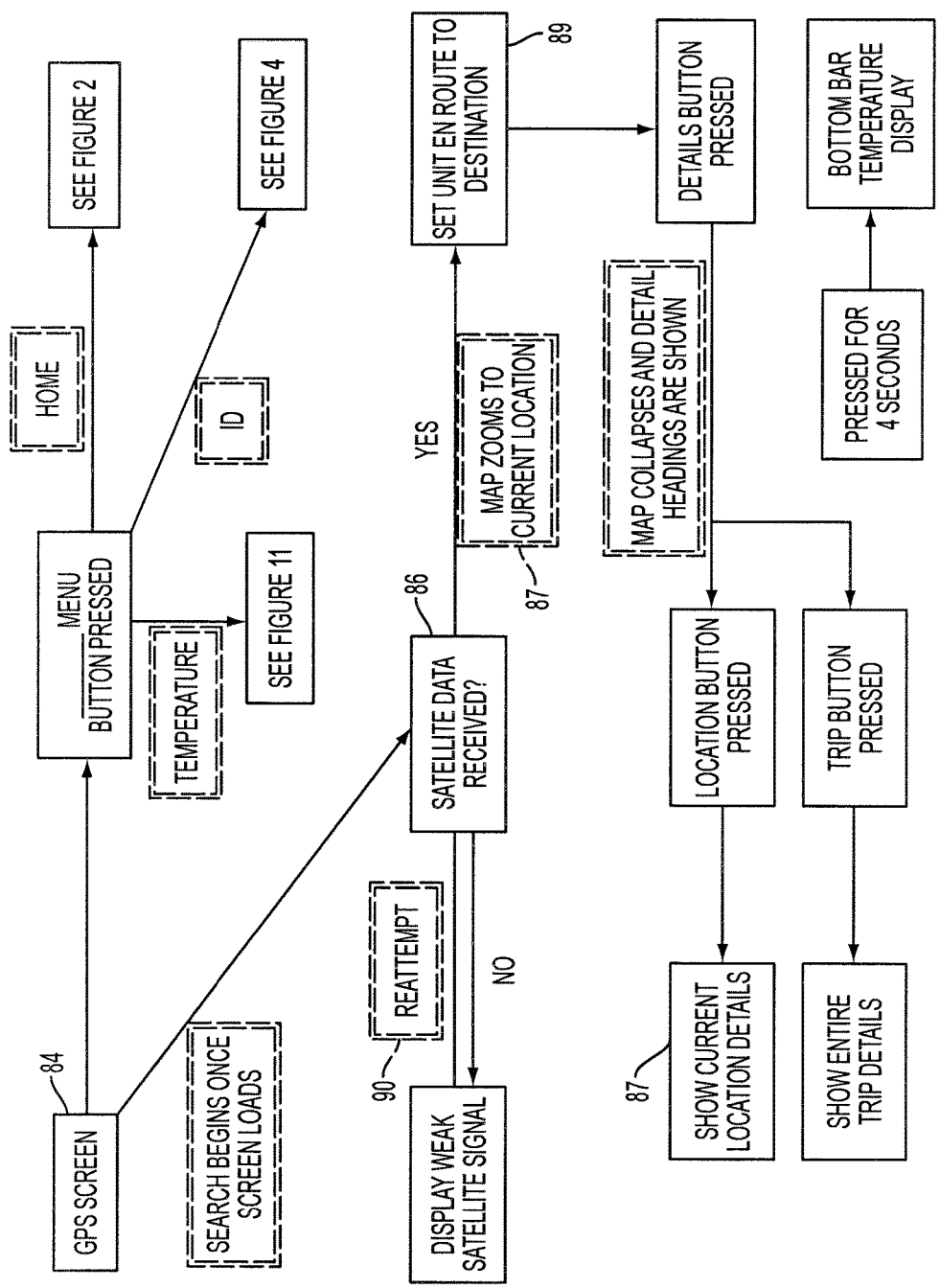
FIG. 9 is a software logic flow chart regarding the real time location and the route of a Cryo BCC system.

As shown in FIGS. 8 and 9, the invention enables the user to remotely gain real time information about the location, route and destination of the container. When the GPS screen button on the container is depressed, the unit attempts to receive data from the hardware enabling geolocation that is located on the BCC system 63 or the smart device 25, as shown in FIG. 1. Referring again to FIGS. 8 and 9, an example of this would be GPS data from satellites 86. If the data received meets the minimum requirements set by the user, it will enable preset buttons to be depressed so that the user can utilize the built in smart device features and infrastructure to display the location of the unit in real time 87. Other features could also be displayed: starting location 88, one or more routes to the destination 89, and chosen destination. If the built in system loses satellite signal or the data received from the GPS receiver is not sufficiently detailed, the BCC system will continue trying to acquire data 90. In addition, the smart device hardware capabilities to acquire geolocation data can be utilized, thus preserving geolocation features without the function of the BCC system's GPS receiver 63. Alternatively, the geolocation hardware built into the BCC system can be used only when an interruption of connection between the invention and smart device has occurred for a predetermined time. That is, it is used when the BCC system is physically separated from, or beyond the range of, the paired smart device.

Figure 10:
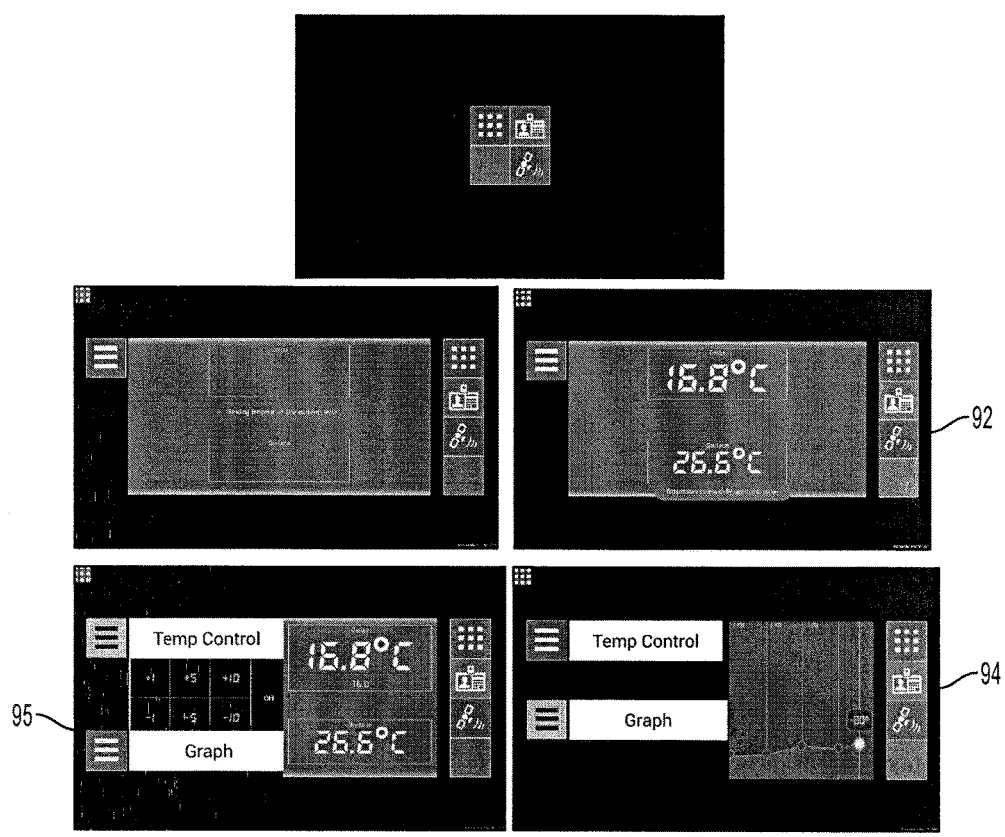
FIG. 10 is a series of pictures of screen shots generated by interface on a smart device or the screen, while remotely or directly altering and tracking the internal and external temperature of a Cryo BCC system unit.
Figure 11:
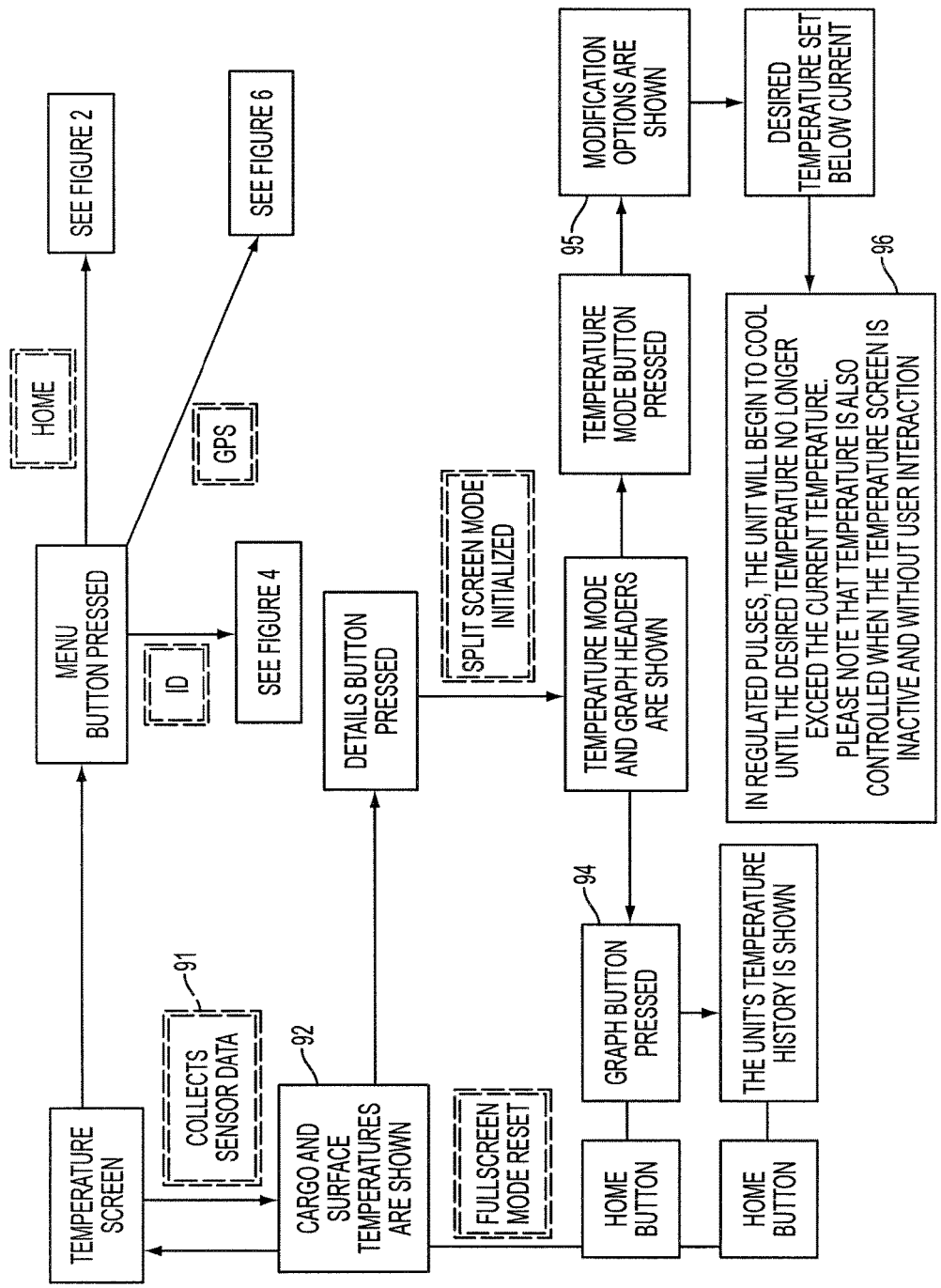
FIG. 11 is a software logic flow chart for regulation and reporting of the temperature of cargo in the Cryo system unit and the temperature outside.

How the hardware and software, of the invention integrated with a Cryo container and an Android-based smart device system is used to control cargo environment will now be described. The BCC system has two temperature sensors 91, shown in FIG. 1, that continuously and concomitantly collect data from the internal and external environment 92, shown in FIGS. 10 and 11. As illustrated in FIG. 1, the data from the sensors is processed by the BCC system microcontroller 20 and, by way of the universal standard BT connection 22, is sent as packets to the smart device 25. These packets may also contain other relevant data obtained from the additional peripheral devices (FIG. 1). The smart device software and hardware is utilized to continuously push the real time data by way of the existing infrastructure into a remote location 26. Referring again to FIGS. 10 and 11, temperature data can then be shown on the smart device as a graph 94 or table, using the smart device software to perform the needed manipulations. It is, of course, to be understood, that any alternative device that can interact or support some of the functions of the smart device can be associated with the BCC system.

This BCC system provides functionalities that heretofore have not been possible. For example, an appropriately credentialed user can remotely control the behavior of the BCC system, simply by interacting with their bonded smart device or related infrastructure 95. This means, in the case of Cryo container for shipping, the Cryo units can alter their temperature as cargo is loaded, saving on coolant and power when this process is delayed. It also empowers the superuser to slightly increase the shipping temperature, rather than just discard the cargo, if for some reason, coolant or power are running low and other types of intervention are not possible. Also, since the Cryo was developed for shipping of healthcare items, the ability of the BCC system to remotely alter temperature means that, if desired, tissue can be warmed up in preparation for use.

Another advantage of the system with Cryo container is that the invention primarily functions without the need for user input. After the cargo is recognized and bonded, the data received from the temperature sensors 91 are processed by the BCC system microcontroller 20 by using its software, compared to the values received from the remote location or server 26. As explained in application U.S. Ser. No. 14/021, 142, U.S. Pat. No. 10,001,313, granted Jun. 19, 2018, the temperature is regulated by controlling the outflow of a coolant by way of an injector or solenoid 96 (FIG. 1). The BCC system uses algorithms, in combination with data received from remote locations and its various peripherals, to determine and sustain the optimum environment for its cargo. Thereby, multiple steps usually requiring personnel input, such as recognizing cargo, setting optimal temperatures, and more, are taken over by the invention. This decreases complexity in terms of user interface, increases the accuracy and efficiency of the process, and decreases human error, sustaining a high level of accountability.

The invention may use proprietary algorithms stored on its dedicated internal memory or at a remote location to dynamically and automatically anticipate and respond to changes in its environment. In the case of a Cryo unit, by processing and analyzing data regarding the optimum temperature of the cargo, records of temperature changes based on the injector activity, and data from the last coolant fill, the BCC system can estimate the amount of coolant left based on current conditions. It can thereby notify appropriate users about how much longer the Cryo will be able to sustain the optimal temperature for the selected cargo. Furthermore, if there are changes in the environment, due to the nature of the continuous data sample, the Cryo/BCC system can account for those changes, self-correct and display the new estimates, possibly via a user-friendly interface on the smart device. In this way the invention makes it possible for the Cryo to respond in real time to dynamic changes in the environment. It is important to note that, although in this embodiment the system is paired with a Cryo in order to control temperature, it can also be combined with alternative hardware, thus allowing for expansion of its function and flexibility in terms of tasks performed in order to fit various user requirements.

As shown in FIG. 1, the BCC system is additionally equipped with a display 97, a piezo speaker 98 and a multicolor high power LED 99. This allows the Cryo to independently and selectively interact with the user by displaying temperature, cargo information and warnings, giving audio feedback via its Piezo speaker and multicolor warnings via the high power LED.

In the embodiment of the invention associated with a Cryo container, once the cargo has been delivered and the task completed, the container can be serviced, fitted for its new task, and rebonded, as described previously and shown in FIG. 6. However, because the BCC system units are always bonded, a superuser can access all the information regarding the Cryo's previous tasks, from the date of its first bonding until the latest. These records may be extremely useful in data mining, for example, showing who used which biomaterial when. In addition, the records can be utilized to exceed the requirements for FDA reporting requirements for biomaterials. Finally, when utilized for shipping, storage, and use of healthcare items, due to the encryption and security layers added, the invention makes compliance with HIPPA regulations simple.

In summary, the preferred embodiment of the present invention was designed around the idea of utilizing a minimum amount of hardware and software to provide all the necessary support to sustain normal function of, in this case, a Cryogenic container. The hardware also enables the user, via standard universal connectors, to install and remove various peripheral components and customize the BCC system according to their needs. Finally, the OTG microcontroller 21 allows the BCC system unit to exchange data and communicate with the smart device 25, making possible utilization of the smart device's hardware, software and existing infrastructure. Use of proprietary hardware and software and the associated specialized infrastructure is therefore avoided. The user reaps the benefit of a smart device and universal connector technology. Such an approach provides an array of functionalities that was heretofore impossible, such as receipt of real time data, cross border enablement, and the ability to remotely control temperature.

What is claimed is:

1. A bonding, communication and control system for a mobile unit, comprising:
a mobile unit having a unique identification code;
an on the go (OTG) microcontroller attached to the mobile unit, the OTG microcontroller having standard input and output connections and a universal serial bus (USB) communication channel;
a microcontroller communicating with the OTG microcontroller;
digital data sensors connected to a standard input of the microcontroller for receiving data identifying contents of the mobile unit, and receiving data identifying a person receiving the mobile unit;
analog data sensors connected to a standard input of the microcontroller for receiving data identifying closure of the mobile unit and temperature of the mobile unit;
a plurality of active devices connected to a standard output of the microcontroller for indicating status of the mobile unit;
a remote smart device coupled through a wireless USB link to the OTG microcontroller for communicating with the OTG microcontroller, the smart device receiving data about the mobile unit from the microcontroller, and transmitting data to the OTG microcontroller through the USB link; and
a remote server and storage in communication with the smart device for receiving and storing data from the OTG microcontroller and transmitting data to the microcontroller through the smart device.

2. The bonding, communication and control system of claim 1 wherein the digital data sensors comprise an ID reader.

3. The bonding, communication, and control system of claim 2 wherein the analog data sensors comprise a temperature sensor.

4. The bonding, communication and control system of claim 3 wherein the plurality of active devices comprise a solenoid and an LED screen.

5. The bonding, communication and control system of claim 3 wherein the analog data sensors further comprise a magnetic switch.

6. The bonding, communication and control system of claim 5 wherein the analog data sensors further comprise a solenoid.

7. The bonding, communication and control system of claim 3 wherein the analog data sensors further comprise a solenoid.

8. The bonding, communication and control system of claim 2 wherein the digital data sensors further comprise an IR diode for receiving information by IR radiation.

9. The bonding, communication and control system of claim 8 wherein the plurality of active devices comprise IR diodes.

10. The bonding, communication and control system of claim 8 wherein the digital data sensors further comprise a GPS module.

11. The bonding, communication and control system of claim 8 wherein the plurality of active devices further comprise IR diodes for communicating with the IR diodes in the digital sensor of other mobile units.

12. The bonding, communication and control system of claim 11 wherein the plurality of active devices further comprise a piezo speaker.

13. The bonding, communication and control system of claim 12 wherein the plurality of active devices further comprise an LED screen.

14. The bonding, communication and control system of claim 1 wherein the plurality of active devices comprise an LED screen and LED lights.

15. The bonding, communication and control system of claim 1 wherein the plurality of active devices comprise a speaker and a solenoid.

16. The bonding, communication and control system of claim 1 wherein the plurality of active devices comprise IR diodes for transmitting information by IR radiation to other mobile units having an IR diode for receiving information.

17. The bonding, communication and control system of claim 16 wherein the digital data sensors comprise an IR diode for receiving information by IR radiation from other mobile units having an IR diode for transmitting information.

18. The bonding, communication and control system of claim 1 further comprising a power source connected to the USB communication channel.

\* \* \* \* \*